(12) United States Patent
Horiguchi

(10) Patent No.: US 7,794,863 B2
(45) Date of Patent: Sep. 14, 2010

(54) FUEL CELL

(75) Inventor: Munehisa Horiguchi, Aichi (JP)

(73) Assignee: Kabushikikaisha Equos Research (JP)

( * ) Notice: Subject to any disclaimer, the term of this patent is extended or adjusted under 35 U.S.C. 154(b) by 646 days.

(21) Appl. No.: 11/032,001

(22) Filed: Jan. 11, 2005

(65) Prior Publication Data

US 2005/0164071 A1 Jul. 28, 2005

(30) Foreign Application Priority Data

Jan. 22, 2004 (JP) ............... 2004-014402

(51) Int. Cl.
*H01M 8/10* (2006.01)
(52) U.S. Cl. .............. 429/30; 429/34; 429/38; 429/32
(58) Field of Classification Search .......... 429/34, 429/38, 39, 32, 30
See application file for complete search history.

(56) References Cited

U.S. PATENT DOCUMENTS

| | | | |
|---|---|---|---|
| 3,432,357 A | 3/1969 | Dankese | |
| 4,548,876 A | 10/1985 | Bregoli | |
| 5,776,624 A | 7/1998 | Neutzler | |
| 5,919,584 A | 7/1999 | Akagi | |
| 5,972,530 A | 10/1999 | Shelekhin et al. | |
| 6,296,964 B1 | 10/2001 | Ren et al. | |
| 6,444,340 B1 | 9/2002 | Jaffrey | |
| 6,468,681 B1 | 10/2002 | Horiguchi | |
| 6,835,477 B1 | 12/2004 | Brambilla et al. | ............. 429/12 |
| 7,056,608 B2 | 6/2006 | Lloyd et al. | |
| 7,150,931 B1 * | 12/2006 | Jaffrey | ............. 429/30 |
| 2003/0082423 A1 | 5/2003 | Kushibiki et al. | |
| 2003/0087140 A1 * | 5/2003 | Kikuchi et al. | ............. 429/26 |
| 2004/0137304 A1 | 7/2004 | Tanaka et al. | |
| 2004/0200187 A1 | 10/2004 | Warrier et al. | |
| 2005/0250003 A1 * | 11/2005 | Zagaja et al. | ............. 429/45 |

FOREIGN PATENT DOCUMENTS

| | | |
|---|---|---|
| DE | 19517443 A1 | 11/1996 |
| GB | 2240988 * | 8/1991 |
| JP | 05-029009 | 2/1993 |
| JP | 06-044981 | 2/1994 |
| JP | 6-338338 | 12/1994 |
| JP | 07-254424 | 10/1995 |
| JP | 08-306371 | 11/1996 |
| JP | 10-247505 | 9/1998 |
| JP | 10-340734 | 12/1998 |
| JP | 2002-184422 | 6/2002 |
| WO | 01/48852 A1 | 7/2001 |

* cited by examiner

*Primary Examiner*—Raymond Alejandro
(74) *Attorney, Agent, or Firm*—Bacon & Thomas, PLLC

(57) ABSTRACT

A fuel cell includes a separator (10B) interposed between adjacent unit cells (10A). A mixed fluid of air and water is supplied to an air electrode (12) of each unit cell. The separator includes a mesh conductor (14) on at least a surface facing the air electrode of the unit cells, and the mixed fluid passes through the mesh conductor. Water is retained on the mesh portion of the conductor. With this configuration, it is possible for the unit cell to be cooled by the release of latent heat when the water is evaporated by the heat of unit cell, without any clogging which inhibits contact between the electrode and the air.

5 Claims, 9 Drawing Sheets

FUEL CELL

INCORPORATION BY REFERENCE

The disclosure of Japanese Patent Application No. 2004-014402 filed on Jan. 22, 2004 including the specification, drawings and abstract is incorporated herein by reference in its entirety.

BACKGROUND OF THE INVENTION

1. Field of the Invention

The present invention relates to a fuel cell, and in particular, to a technology for cooling the fuel cell using a separator interposed between unit cells of the fuel cell.

2. Description of the Related Art

A unit cell of a PEM fuel cell, which is one type of fuel cell, includes a fuel electrode (also referred to as the "hydrogen electrode" since hydrogen gas is generally used as the fuel), an oxidant electrode (likewise, hereinafter referred to as the "air electrode" since air, as an oxygen-containing gas, is used as the oxidant), and a solid polymer electrolyte membrane interposed between the fuel electrode and the air electrode. The fuel electrode and the air electrode each include a catalyst layer containing catalyst substance and an electrode base member. The electrode base member functions to support the catalyst layer, and allows reactant gas to flow therethrough. Further, the electrode base member also acts as a current collector. Separators (connector plates) are stacked outside the fuel electrode and the air electrode. Gas flow fields are formed on the separators for uniformly supplying the hydrogen and the air as reactant gases from the outside of the cell to the electrode surfaces, and discharging excess reactant gases to the outside of the cell. Generally, the gas flow fields are formed from grooves facing the electrode surface. The separators prevent gas leakage, and enable generated electrical current to be collected and transferred to the outside. The unit cell and the separators form a single unit cell.

In an actual fuel cell, a large number of the unit cells are stacked together serially to form a cell module. In the fuel cell, in order to maintain sufficient power generation efficiency, it is necessary to maintain the humidity of the solid polymer electrolyte membrane at a sufficient level. In general, since the water generated in the electrochemical reaction is not sufficient for maintaining adequate moisture, it is necessary to provide a device for supplying water to each of the unit cells for humidification. Further, since heat energy is also generated (the amount of this heat energy substantially corresponds to the electrical energy generated in the electrochemical reaction), a cooling device for preventing overheating of the fuel cell body is provided.

Various types of cooling devices for the fuel cell have been proposed. In some types of cooling device, cooling is performed together with humidification of the electrolyte membrane (for example, see Japanese Patent Application Laid-Open No. 10-247505). In this technology, water is added to the air supplied to the fuel cell in advance. The water is vaporized in a cooling gas flow field so as to cool the fuel cell, and then the air containing the water vapor is circulated through an air flow field.

Further, in another type of proposed cooling device, a hollow space separated from a gas flow field is formed in a separator. Cooling water flows through the hollow space, and vapor of the cooling water is supplied to an air flow field through a porous wall surface (for example, see Japanese Patent Application Laid-Open No. Hei 06-338338).

However, with the related disclosed technology, it is difficult to perform both cooling and humidification of the membrane. For example, according to the disclosure of Japanese Patent Application Laid-Open No. 10-247505, the liquid water is vaporized into vapor in the cooling gas flow field, and the air containing the vapor is then circulated again into the air flow field. As a result, it is difficult to maintain the temperature of the cooling gas flow field in the circulation passage. For example, when the temperature increases in the air flow field having decreased in the circulation passage, moisture is removed from the electrolyte membrane, which makes it is difficult to maintain the humidity in the membrane.

Further, with the technology disclosed in Japanese Patent Application Laid Open No. 06-338338, even though the vapor is supplied through the porous wall surface, it may be difficult to achieve sufficient supply of vapor by using the moisture passing through the porous wall surface. Further, in the cooling water passage, cooling is only performed using the sensible heat. Therefore, in order to perform sufficient cooling, substantial amounts of energy or a mechanical device for circulation of the cooling water may be required.

SUMMARY OF THE INVENTION

The present invention was conceived of while taking the above circumstances into account, and an object thereof is provide a fuel cell in which air and cooling water are directly supplied to an air electrode, and in which both cooling and membrane humidification can be simultaneously maintained using a simple structure. Further, the present invention provides a fuel cell which achieves efficient cooling.

In order to achieve the above object, according to a first aspect of the present invention, a fuel cell is formed by stacking unit cells (10A) and a separator (10B) interposed between the unit cells. Each of the unit cells includes an electrolyte membrane (11), and a fuel electrode (13) and an air electrode (12) provided on respective surfaces of the electrolyte membrane. A mixed fluid of air and water is supplied to the air electrode of the unit cell through the separator. The separator includes a mesh conductor (14) through which the mixed fluid passes. The mesh conductor is at least provided on, among the respective surfaces of the separator that face the electrodes, the surface facing the air electrode.

According to the present invention, the cooling water, which is supplied together with the air, uniformly adheres to and is retained on the mesh conductor. Therefore, it is possible to achieve uniform latent heat cooling over all of the electrode surface, and thus, cooling performance is improved. Further, in comparison with the related art in which the back surface of the separator is cooled to indirectly cool the electrode, it is possible to cool a portion closer to the electrode, and thus cooling performance is improved. Further, the mesh conductor functions as a cooling fin which contacts the supplied air, whereby cooling performance is further improved.

Further, in the above first aspect of the invention, it is preferable that the opening ratio of the mesh conductor is 25% or more. Further, it is preferable that a hydrophilic treatment is applied to the mesh conductor so that water adheres to and is retained on the mesh conductor. In this case, the mesh conductor may be bent to have a rectangular cross section, and the gas interruption plate may be a thin flat plate. Specifically, the separator may be formed by layering the mesh conductor and a gas interruption base plate (16). Further, the mesh conductor may be made of metallic mesh that allows the mixed fluid to pass through spaces between mesh strands of the mesh conductor, or the mesh conductor may be a thin metal plate made of punching metal having punched holes through which the mixed fluid can pass. Alternatively, the mesh conductor may be made of expanded metal having rhombic slits through which the mixed fluid can pass.

By designing the opening ratio of the mesh conductor to be 25% or more, a sufficiently large contact area between the air as an oxidizing gas and the electrode is ensured. Further, by applying a treatment to the conductor so as to give it hydrophilic properties, the water adheres to and is retained on the mesh portion, and thus cooling efficiency is improved. Further, if the mesh conductor is made of metal mesh, punching metal, or expanded metal, the openings of the mesh conductor are distributed finely and uniformly, whereby an adequate opening ratio is achieved. Further, the mixed fluid passing through the openings of the contact surface with the electrode diffusion layer is stirred up, which enables the above described advantages to be achieved with greater reliability. Moreover, if expanded metal is used, contact resistance is small, because expanded metal has high rigidity with regard to thickness in comparison with other materials. Further, if the conductor is a corrugated plate, in comparison with the case in which a flat plate is used, it is possible to increase the proportion of the surface area that comes into contact with the diffusion layer, and, in addition, the amount of water that comes into contact with the corrugated plate is increased. As a result, cooling efficiency can be improved.

DETAILED DESCRIPTION OF THE PREFERRED EMBODIMENTS

The present invention can be advantageously applied, in particular, to a fuel cell in which cooling water is directly injected to and then mixed with air supplied to an air electrode of the fuel cell. In the present invention, the cooling water uniformly adheres to and is retained on a mesh like conductor. As a result, latent heat cooling can be performed uniformly over the entire electrode surface utilizing the heat generated in the reaction, whereby cooling performance can be improved.

First Embodiment

Figure 1:
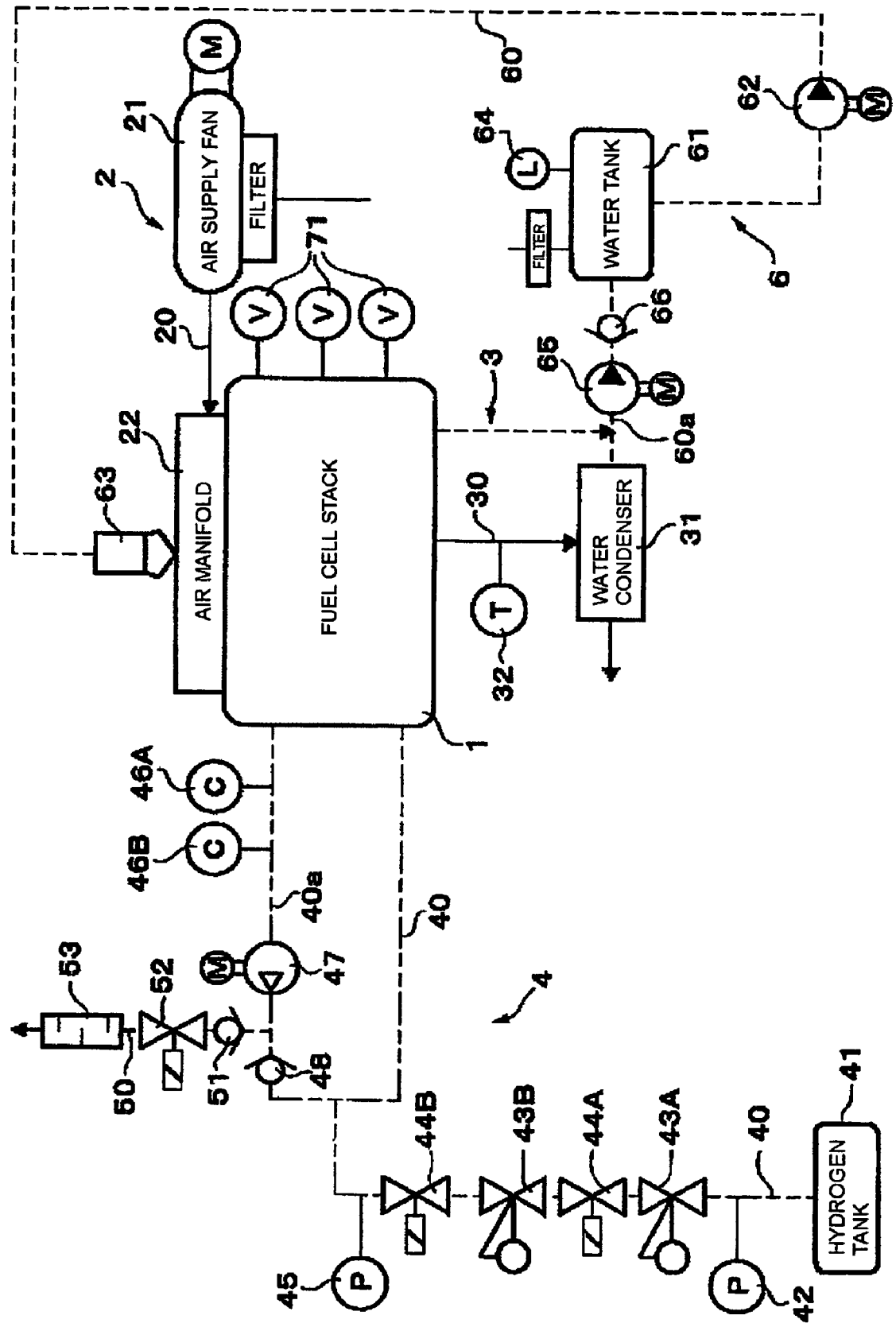
FIG. 1 is a view showing the structure of a fuel cell system.

Hereinafter, embodiments of the present invention will be described with reference to the drawings. Firstly, FIGS. 1 to 7 show a first embodiment of the present invention. FIG. 1 is a view showing an exemplary structure of a fuel cell system for use in a vehicle; the fuel cell system includes a fuel cell stack 1 according to the present invention. The fuel cell system includes a fuel cell main unit with the fuel cell stack 1 as a main component, an air supply system 2 (see the solid lines in FIG. 1), and an air discharge system 3. The air supply system 2 includes an air supply fan 21 that acts as an air supply device for supplying air to the fuel cell system 1, and the air discharge system 3 includes a water condenser 31. Further, the fuel cell system also includes a fuel supply system 4 (see the two dot chain lines in FIG. 1) and a water supply system 6 (see the broken lines in FIG. 1). The fuel supply system 4 includes a hydrogen tank 41 that acts as a hydrogen supply device, and the water supply system 6 humidifies and cools a portion of the fuel cell stack 1 where a reaction occurs.

The air supply fan 21 provided in the fuel cell main unit is connected to an air manifold 22 through an air supply passage 20. The air manifold 22 is connected to a casing (not shown) containing the fuel cell stack 1. The water condenser 31 is disposed in an air discharge passage 30 of the casing, and connected to the fuel cell stack 1. Further, an exhaust gas temperature sensor 32 is also disposed in the air discharge passage 30.

The fuel supply system 4 sends the hydrogen stored in the hydrogen tank 41 to a hydrogen passage of the fuel cell stack 1 through a hydrogen supply passage 40. A hydrogen primary pressure sensor 42, a pressure regulating value 43A, a supply solenoid valve 44A, a pressure regulating valve 43B, a supply solenoid valve 44B, and a hydrogen secondary pressure sensor 45 are provided, in that order, in the hydrogen supply passage 40 between the hydrogen tank 41 and the fuel cell stack 1. Further, the hydrogen supply passage 40 is connected to a hydrogen return passage 40a, and a hydrogen discharge passage 50. Hydrogen concentration sensors 46A and 46B, a suction pump 47, and a check valve 48 are provided, in that order, in the hydrogen return passage 40a from the fuel cell stack 1. The hydrogen supply passage 40 is connected to the downstream side of the check valve 48. The hydrogen discharge passage 50 is connected to the hydrogen return passage 40a between the suction pump 47 and the check valve 48. Further, a check valve 51, a discharge solenoid valve 52, and a combustor 53 are provided in the hydrogen discharge passage 50.

The water supply system 6 sends water stored in a water tank 61 to a large number of nozzles 63 provided in the air manifold 22 of the fuel cell stack 1 through a water supply passage 60. A pump 62 is provided in the water supply passage 60, and a level sensor 64 is provided in the water tank 61. Further, the water supply system 6 includes a water return passage 60a connecting the fuel cell stack 1 and the water tank 61. A pump 65 and a check valve 66 are provided in the water return passage 60a. The water return passage 60a is connected to the water condenser 31 on the upstream side of the pump 65. It should be noted that, in FIG. 1, reference numeral 71 denotes voltmeters for monitoring the electromotive force of the fuel cell.

During operation of the above-configured fuel cell system, the air supply fan 21 is operated to supply air to the air manifold 22, and the pump 62 is operated to supply water from the water supply system 6. Further, the supply solenoid valves 44A and 44B are operated to supply hydrogen from the fuel supply system 4. At this time, in the fuel supply system 4, the hydrogen pressure on the side of the hydrogen tank 41 is monitored by the hydrogen primary pressure sensor 42. The hydrogen regulating valves 43A and 43B appropriately regulate the pressure of the hydrogen that is supplied to the fuel cell stack 1. The supply solenoid valves 44A and 44B are opened or closed in order to electrically control the supply of hydrogen gas to the fuel cell stack 1. The supply of hydrogen gas is interrupted by closing the supply solenoid valves 44A and 44B. Further, the hydrogen secondary pressure sensor 45 monitors the pressure of the hydrogen gas immediately before it is supplied to the fuel cell stack 1. In addition, in the water supply system 6, the water in the water tank 61 is sent under pressure to the nozzles 63 in the air manifold 22 by the pump 62. Then, the water is continuously or intermittently injected from the nozzles 63 into the air manifold 22. The resultant water spray mixes with the air flow, and is sent to the fuel cell stack 1.

Figure 2:
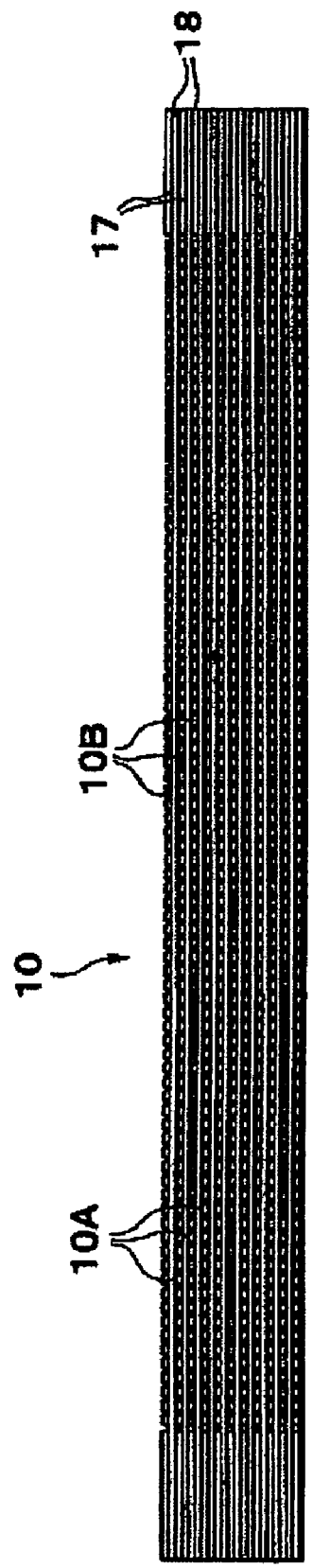
FIG. 2 is a plan view showing a cell module of a fuel cell stack according to a first embodiment of the present invention.
Figure 3:
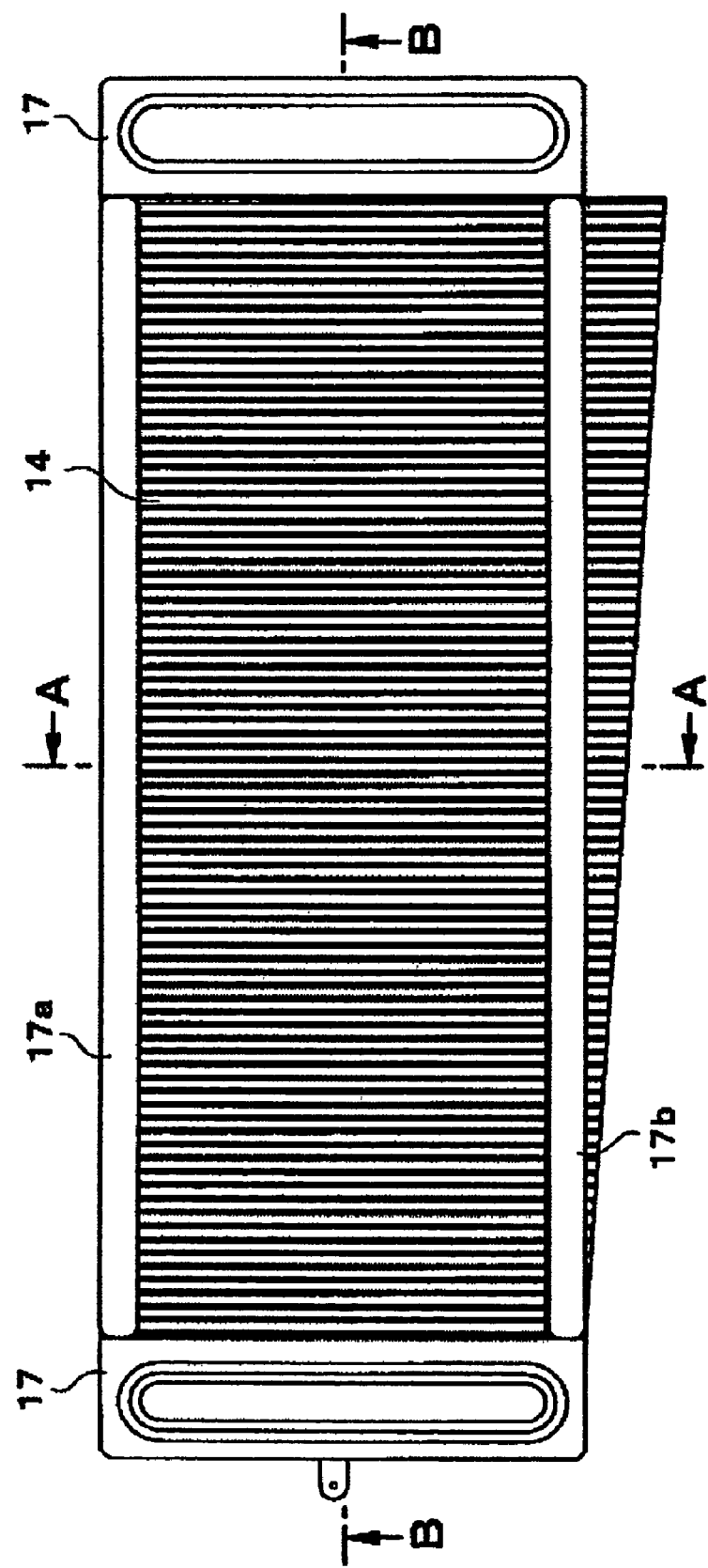
FIG. 3 is a front view showing the cell module as viewed from an air electrode side.
Figure 4:
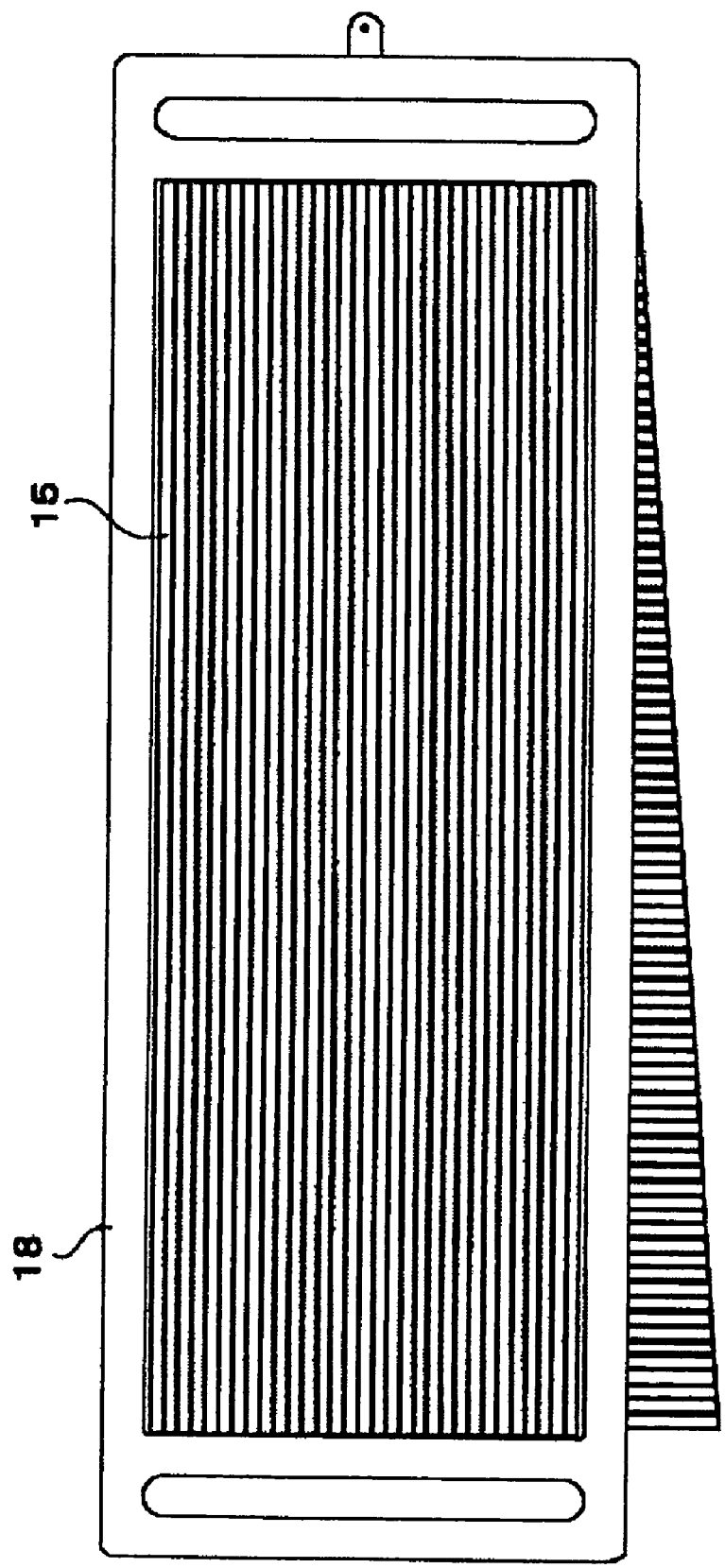
FIG. 4 is a front view showing the cell module as viewed from a fuel electrode side.

FIGS. 2 to 7 show the structure of a cell module 10, which is a unit of the above-configured fuel cell stack 1 of the fuel cell system. FIG. 2 is a plan view showing the cell module 10 (hereinafter, vertical and horizontal positional relationships will be described on the basis of the shown positioning and layout of the cell module 10). FIG. 2 shows a unit cell (MEA) 10A, a separator 10B, and two types of frame, namely, frames 17 and 18 supporting the unit cell 10A and the separator 10B that are considered as a single set of structural elements. A plurality of these sets (in FIG. 2, 10 sets) are stacked in the thickness direction of the layers to form the fuel cell module 10. The separator 10B electrically connects adjacent unit cells 10A, and separates flow fields of the hydrogen gas and the air supplied to the unit cells 10A. Since the unit cells 10A are positioned inside the frames 18, the unit cells 10A are not shown clearly in FIG. 2. In the cell module 10, the unit cells 10A and the separators 10B are stacked together using the frames 17 and 18 as spacers arranged alternately such that the adjacent unit cells 10A are spaced apart from each other by a predetermined distance. At one end in the stacking direction (the uppermost surface in FIG. 2), as shown in FIG. 3, the cell module 10 has an end surface that is formed by the longitudinally corrugated surface of the separator 10B and the end faces of the frame 17. At the other end (the lowermost surface in FIG. 2), as shown in FIG. 4, the cell module 10 has an end surface that is formed by the laterally corrugated surface of the separator 10B and the end faces of the other frame 18.

Figure 5:
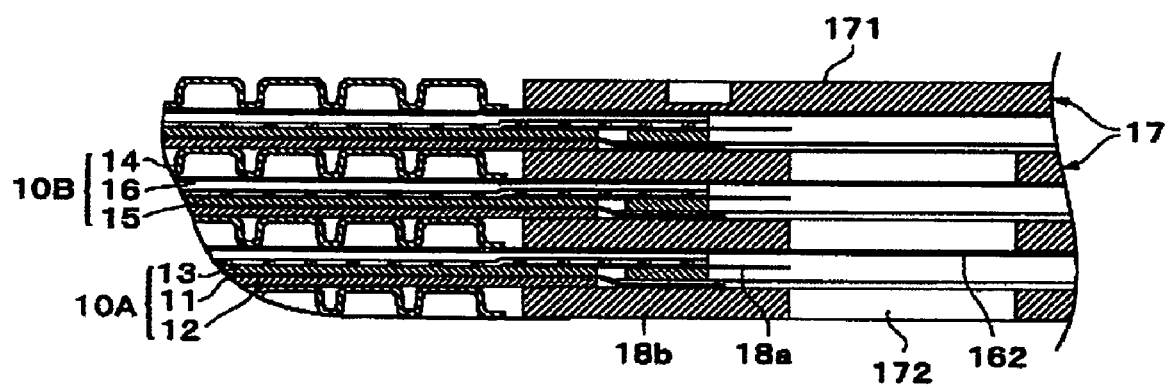
FIG. 5 is a cross sectional view taken along a line A-A in FIG. 3.
Figure 6:
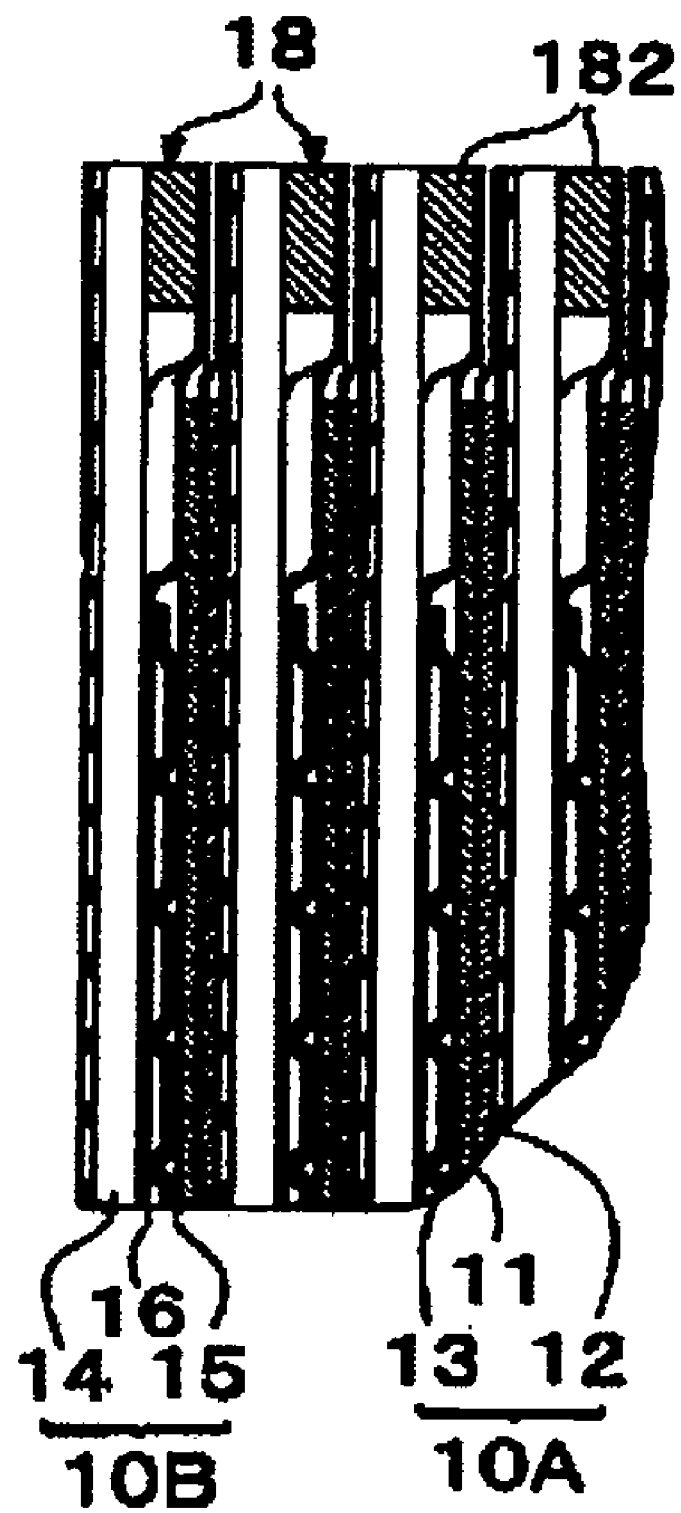
FIG. 6 is a longitudinal sectional view taken along a line B-B in FIG. 3.
Figure 7:
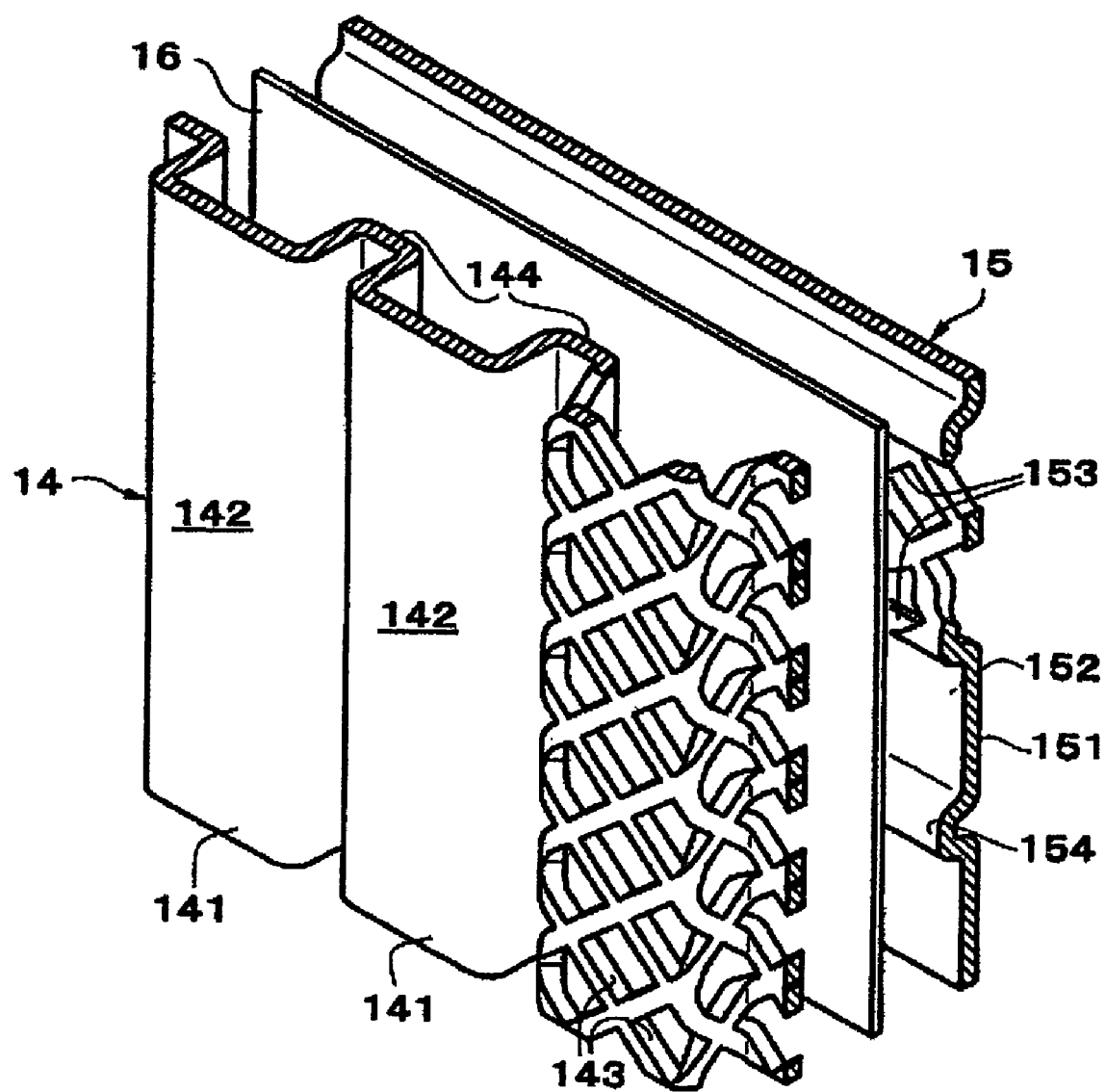
FIG. 7 is an exploded partial perspective view showing a separator of the cell module.

As shown in the expanded cross sectional views of FIGS. 5 and 6, each of the unit cells 10A includes a solid polymer electrolyte membrane 11, an air electrode 12 as an oxidant electrode provided on one surface of the solid polymer electrolyte membrane 11, and a fuel electrode 13 provided on the other surface of the solid polymer electrolyte membrane 11. Each of the air electrode 12 and the fuel electrode 13 includes a diffusion layer and a catalyst layer formed there above. The diffusion layer is made of an electrically conductive material that enables the reactant gas to be diffused and pass there through. The catalyst layer includes a catalytic substance and is in contact with the solid polymer electrolyte membrane 11 which supports the catalytic substance. Among the components of the unit cell 10A, the air electrode 12 and the fuel electrode 13 have lateral dimension that are slightly larger than the width of the opening of the frame 18, which acts as the support member of the air electrode 12 and the fuel electrode 13. Further, the air electrode 12 and the fuel electrode 13 have longitudinal dimensions that are slightly smaller than the height of the opening of the frame 18. The solid polymer electrolyte membrane 11 has longitudinal and lateral dimensions that are larger than the dimensions of the opening of the frame 18 in the longitudinal and lateral directions.

The separator 10B includes a separator base plate 16 that acts as a gas interruption member between the unit cells 10A; a mesh like current collector (hereinafter referred to as the "air electrode side collector") 14 provided on one side of the separator base plate 16; and a mesh like current collector (hereinafter referred to as the "fuel electrode side collector") 15 provided on the other side of the separator base plate 16. The air electrode side collector 14 contacts the electrode diffusion layer of the air electrode 12 of the unit cell 10A, thus enabling collection of electrical current, and has a large number of openings for allowing the mixed fluid of the air and water to pass through the air electrode side collector 14. The fuel electrode side collector 15 contacts the electrode diffusion layer of the fuel electrode 13 of the unit cell 10A, thus enabling electrical current to be output to the outside. In order to maintain the predetermined positional relationship of the structural elements of the separator 10B and the unit cell 10A, the frame 17 is provided on both left and right sides of the air electrode side collector 14 (note that, only the frame 17 has its upper and lower ends connected by backup plates 17a and 17b at the outermost sides to form a frame shape (see FIG. 3)), and the frame 18 is provided around the fuel electrode side collector 15 and the unit cell 10A. In this embodiment, the collectors 14 and 15 are thin metal plates with, for example, a thickness of about 0.2 mm. Further, the separator base plate 16 is formed as a thin metal plate, which is even thinner than the collectors 14 and 15. The metal used for the plates is, for example, an electrically conductive anticorrosive metal such as stainless steel, nickel alloy, or titanium alloy, which has been gold plated or the like by an anti-corrosion electrical conductivity treatment. Further, the frames 17 and 18 are made of suitable insulating material.

As shown in FIG. 3, the overall shape of the air electrode side collector 14 is a laterally long rectangle (only the bottom side is slanted for improving water discharging efficiency). As shown in detail in the expanded partial view of FIG. 7, the air electrode side collector 14 has mesh like openings 143 with an opening ratio of 59% (in order to make the plate surface shape easier to comprehend, the mesh shape is shown for only a portion of the air electrode side collector 14). The air electrode side collector 14 is made of an expanded metal plate which is a corrugated plate having fine protruding corrugations 141 fabricated by press forming. The protruding corrugations 141 are formed to be parallel with each other at equal intervals along the longitudinal sides of the plate (the short sides in the illustrated embodiment), and extend over the entire plate surface in the longitudinal direction. Each of the protruding corrugations 141 has a substantially rectangular semi-wave-like cross section, with a base that slightly expands as a result of die cutting processing at the time of press forming. The height of these protruding corrugations 141 and the thickness of the frame 17 are substantially the same. Therefore, when the components of the fuel cell stack 1 are stacked together, an air flow field is formed having a predetermined opening area and extending in the longitudinal direction between the opposite sides of the frame 17. Flat top surfaces 142 of the protruding corrugations 141 contact the diffusion layer of the air electrode 12, and grooves 144 between the protruding corrugations 141 contact the base plate 16.

Note that, the air electrode side collector 14 has hydrophilic properties as a result of being hydrophilically treated. For the treatment method, hydrophilic treatment agent is applied to the surface of the air electrode collector 14. The treatment agent applied to the surface of the air electrode collector 14 may be, for example, polyacrylamide resin, polyurethane resin, or titanium oxide ($TiO_2$). Moreover, for example, a treatment that enables a coarse metal surface to be produced may be performed as an alternative hydrophilic treatment. For example, a plasma treatment may be used as the hydrophilic treatment. Preferably, the hydrophilic treatment is applied to the area that is likely to have the highest temperature, for example, the top surfaces 142 of the protruding corrugations 141 which contact the unit cell 10A and, in particular, the air flow field side. As a result of the hydrophilic treatment, (a) wettability of the contact surface between the collector 14 and the diffusion layer of the air electrode 12 is improved, and (b) the effect achieved by latent heat cooling of the water is raised. Further, since the mesh openings are not clogged easily by water, it is not likely that the supply of air will be affected by the water.

The fuel electrode side collector 15 has mesh like openings 153 having the same dimensions as those of the air electrode side collector 14 (in order to make the plate surface shape easier to comprehend, the mesh shape is shown for only a portion of the air electrode side collector 15). The fuel electrode side collector 15 is made of an expanded metal plate having a rectangular shape. The fuel electrode side collector 15 has a plurality of protruding corrugations 151 fabricated by extrusion in press forming. Each protruding corrugation 151 has a flat top surface 152, and has a substantially rectangular semi-wave-like shape like that of the previously described protruding corrugation 141. In the case of the collector 15, the protruding corrugations 151 extend to cross the entire plate surface in the lateral direction, and are formed with equal spacing therebetween in the longitudinal direction. The flat top surfaces 152 of the protruding corrugations 151 contact the fuel electrode 13, and grooves 154 between the protruding corrugations 151 contact the separator base plate 16. Further, each protruding corrugation 151 has a substantially rectangular semi-wave like cross section, with a base that slightly expands as a result of die cutting process at the time of press forming. The height of the protruding corrugations 151 and the thickness of the unit cell 10A when combined is substantially equal to the thickness of the frame 18. Therefore, when these structural elements of the fuel cell stack 1 are stacked together, a fuel flow field having a predetermined opening area extending in the lateral direction inside the frame 18 is formed.

The separator base plate 16 is interposed between the above-structured collectors 14 and 15 such that the respective protruding corrugations 141 and 151 are positioned outside. At this time, the grooves 144 and 154 of the collectors 14 and 15 contact the separator base plate 16, and are electrically connected with each other. Further, when the collectors 14 and 15 are stacked on the separator base plate 16, the air flow field is formed on one surface of the separator base plate 16, and the fuel flow field is formed on the other surface of the separator base plate 16. Thus, the air and water flow through the air flow field formed in the longitudinal direction, and are supplied to the air electrode 12 of the unit cell 10A. Likewise, the hydrogen flows through the fuel flow field formed in the lateral direction, and is supplied to the fuel electrode 13 of the unit cell 10A.

The frames 17 and 18 are provided around the above-described separator 10B. As shown in FIGS. 5 and 6, each of the frames 17 (except the frame 17 positioned at the outer end of the fuel cell stack 1 (the uppermost frame 17 in FIG. 5), and the frame 17 at the left end position in FIG. 6) surrounding the collector 14 has only longitudinal frame sections 171 surrounding both sides of the collector 14, i.e., extending along the short sides thereof. A long hole 172 that acts as a passage for the fuel extends through each of the longitudinal frame sections 171 in the thickness direction. The thickness of the frame 17 is equal to the thickness of the collector 14, which is formed with the corrugated-plate like shape. Therefore, the positional relationship of the structural elements of the fuel cell stack 1 is designed such that the protruding corrugations 141 of the collector 14 contact the air electrode 12 of the unit cell 10A, and the grooves 144 communicate with the collector 15 through the separator base plate 16 when the frame 17 and the collector 14 are put together. Note that, the outer dimensions of the separator base plate 16 correspond to the height and the entire width of the frame 17. The separator base plate 16 has a long hole 162 similar to the long hole 172, which is positioned so as to overlap with the long hole 172. In this manner, the air flow field is defined between the longitudinal frame sections 171 on both sides of the frame 17. The air flow field is surrounded by the surface of the air electrode 12 of the unit cell 10A and the separator base plate 16, and extends over the entire surface of the air electrode 12 in the longitudinal direction.

The size of the frame 18 surrounding the collector 15 and the unit cell 10A is identical to the size of the frame 17. However, the frame 18 is different from the frame 17 in that the frame 18 has a complete frame shape including left and right longitudinal frame sections and upper and lower lateral frame sections 182. Note that, the left and right longitudinal frame section is not shown since it is at a position further to the right than the area shown in FIG. 5. The left and right longitudinal frame sections of the frame 18 have side ends that have substantially the same size as the left and right side ends of the longitudinal frame sections 171 of the frame 17. Each of the frames 18 (except the frame 18 positioned at the outer end of the fuel cell stack 1 (the lowermost frame 18 in FIG. 2, namely, the surface shown in FIG. 4)) includes a thin backup plate 18a and a thick backup plate 18b which extend parallel to the left and right longitudinal frame sections. The backup plate 18a and the backup plate 18b overlap with the left and right ends of the collector 15. A space surrounded by the backup plate 18a and the longitudinal frame section forms the fuel flow field in alignment with the long hole 172 extending through the frame 17 in the thickness direction. The thickness of the frame 18 is equal to the thickness of the collector 15 which is formed with the corrugated-plate like shape and the thickness of the unit cell 10A. Therefore, the positional relationship of the structural elements of fuel cell stack 1 is designed such that the protruding corrugations 151 of the collector 15 contact the fuel electrode 13 of the unit cell 10A, and the grooves 154 communicate with the collector 14 through the separator base plate 16 when the frame 18 and the collector 15 are put together. Thus, the fuel flow field in the frame stacking direction is formed in alignment with the long hole 172 of the longitudinal frame section 171 of the frame 17 between both of the longitudinal sections of the frame 18 and the backup plate 18a. Further, inside each of the frames 18, the corrugated collector 15 defines the fuel flow field which acts as a flow passage extending in the lateral direction between the separator base plate 16 and the backup plate 18a.

The above-described frames 17 and 18 support the collectors 14 and 15, and the separator base plate 16 to form the separator 10B. The separators 10B and the unit cells 10A are stacked alternately to form the cell module 10. As shown in FIG. 2, the stack of the cell module 10 has a slit like air flow field extending in the longitudinal direction over the entire area surrounded by the frames 18, from the upper surface of the cell module 10 to the lower surface of the cell module 10.

A plurality of the above-structured cell modules 10 are arranged in the casing to form the fuel cell stack 1 (see FIG. 1). The air and water, which are mixed in the air manifold 22, are supplied from an upper area of the fuel cell stack 1. The hydrogen is supplied from the side of the fuel cell stack 1, thus enabling power generation. When supplying the air and water to the air flow field, the spray of water droplets is mixed with the air fluid (the mixture of the water and air is hereinafter referred to as the "mixed fluid"), and the mixed fluid flows into the upper area of the air flow field. During normal operation of the fuel cell, since heat is generated by the reaction in the unit cell 10A, the mixed fluid in the air flow field is heated. As a result of the hydrophilic treatment, some of the water droplets adhere to and are retained on the mesh portion of the separator 14 and the air electrode 12 of the unit cell 10A. The water droplets which do not adhere to the mesh portion of the separator 14 are heated in the gas phase between the separator 14 and the electrode diffusion layer to cause a latent heat cooling effect, i.e., to cause vaporization of water for removing heat from the separator 14. The water vapor inhibits vaporization of water in the solid polymer electrolyte membrane 11 from the side of the air electrode 12, and humidifies the solid polymer electrolyte membrane 11. Then, excess water and vapor in the air flow field are discharged from the opening of the air flow field that is located in the lower area of the fuel cell stack 1.

The hydrogen is supplied to the fuel flow field from the long hole of the longitudinal frame section of the outermost frame 18 shown in FIG. 4. The hydrogen flows through the long holes 162 and 172 of the separator base plate 16 and the longitudinal section 171 of the frame 17 which are stacked together, and flows into the space surrounded by the longitudinal and lateral frame sections and the backup plate 18a of each frame 18. The hydrogen is then supplied toward the fuel electrode 13 side of the unit cell 10A through the space between the separator base plate 16 and the backup plate 18a. In this manner, the hydrogen is supplied to the fuel electrode 13 of the unit cell 10A. The hydrogen is consumed while flowing in the lateral direction along the fuel electrode 13. Excess hydrogen which has not been used in the reaction is discharged from the opposite side of the hydrogen flow field. The hydrogen is circulated by a pipe connected to the hydrogen flow field as shown in FIG. 1. Eventually, the hydrogen is discharged to the combustor 53.

Note that, the water is supplied to the fuel cell stack 1 together with the air. As described above, the water is partially retained on the mesh portion of the separator 14, and evaporated. The remaining water which is not retained on the mesh portion of the separator 14 is evaporated in the gas phase to remove the latent heat. Therefore, evaporation of water in the electrolyte membrane 11 of the air electrode 12 is inhibited. Thus, the electrolyte membrane 11 is not dried from the side of the air electrode 12, and the uniform humidified state of the electrolyte membrane 11 is always maintained by the water generated in the reaction. Further, the water supplied to the surface of the air electrode 12 removes the heat from the air electrode 12 itself, and cools the air electrode 12. In this manner, it is possible to control the temperature of the fuel cell stack 1.

The flow of the hydrogen in the fuel cell stack 1 has been described previously. In the fuel supply system 4, concentration of the hydrogen gas discharged from the hydrogen passage of the fuel cell stack 1 by suction of the pump 47 is measured by the concentration sensors 46A and 46B. If the concentration of the hydrogen gas is a predetermined level or higher, the solenoid valve 52 is closed in order to allow the hydrogen to flow back to the hydrogen supply passage 40 through the circulation check valve 48. Further, if the concentration of the hydrogen gas is less than the predetermined level, the discharge solenoid valve 52 is opened intermittently, thus enabling discharge of the hydrogen to the combustor 53 through the check valve 51 and the solenoid valve 52. After the hydrogen is combusted completely in the combustor 53, the exhaust gas is discharged to the outside.

Thus, in this system, even though no special cooling water system is provided for the fuel cell stack 1, water is supplied to the fuel cell stack 1 by making use of the air flow. Therefore, it is possible to sufficiently humidify, and cool the fuel cell stack 1. At this time, the temperature of the fuel cell stack 1 is controlled by suitably controlling the output or the operation interval of the pump 62 in correspondence with the temperature of the air discharged from the fuel cell stack 1 which is detected by the exhaust air temperature sensor 32. Accordingly, the injection amount of the air injected into the air manifold 22 from the nozzles 63 is controlled, and the desired temperature is maintained. Specifically, if the flow rate of the water supplied to the fuel cell stack 1 is increased, the amount of evaporation is increased, and if the flow rate of water is decreased, the amount of evaporation is decreased. Further, if the flow rate of the air is increased, the temperature is decreased, and if the flow rate of the air is decreased, the temperature is increased. Therefore, by controlling the flow rate of water and the flow rate of the air supplied to the fuel cell stack 1, it is possible to control the operating temperature. Note that, the water is discharged from the fuel cell stack 1 together with the air. At this time, most of the discharged water remains in a liquid state. Therefore, the water flowing through the water return passage 60a is sucked by the flow pump 65, and flows back to the water tank 61 through the check valve 66. The water vapor or the remaining water which is not collected into the water return passage 60a is either (a) condensed into a liquid by the water condenser 31, or (b) flows through the water condenser 31 without being condensed and is sucked back to the water tank 61 by the pump 65. It should be noted that the vapor is present in the exhaust air due to the water generated in the power generation reaction. The water level of the water tank 61 is monitored by the water level sensor 64.

This system has the characteristic features that, each of the collectors 14 and 15 includes the fine mesh like portion, and the openings are formed on the surface which contact the electrode diffusion layer. Therefore, when the mixed fluid of the air and water flows through the openings, the water and the air are stirred up, and the mixture gas is supplied to the contact surfaces between the collectors 14 and 15 and the electrode diffusion layers. Thus, it is possible to supply the air to all of the electrode surfaces of the fuel cell stack 1, and concentration polarization is reduced. Further, since the electrode contacts the mesh like portion of the collector, current collection is performed uniformly from the entire electrode, and current collection resistance is reduced. Moreover, since the catalyst throughout the entire electrode is effectively utilized, activation polarization is reduced. Additionally, the effective area of the electrode used for power generation is increased advantageously.

In the first embodiment given as an example, the portions of the separator that contact with the electrode diffusion layers, i.e., the collector 14 and the collector 15 are made of expanded metal. However, alternatively, the collectors 14 and 15 may be made of another material such as metal resin, porous metal, two dimensional woven metal fabric, non-woven metal fabric, a corrugated metal body, a metal body having grooves, metallic mesh, or punching metal. Next, another embodiment in which the material of the collector is changed will be described.

Second Embodiment

Figure 8:
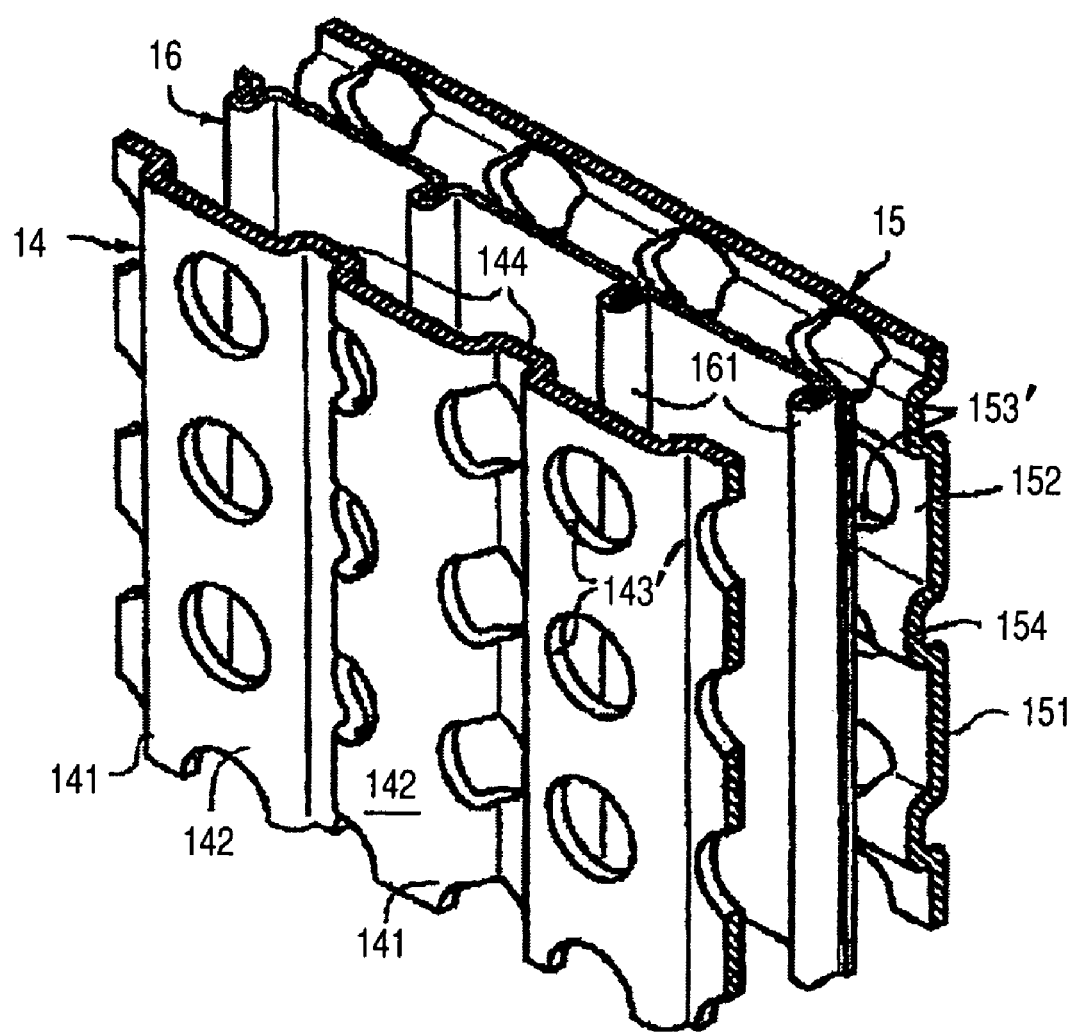
FIG. 8 is an exploded partial perspective view showing a separator according to a second embodiment of the present invention.

In a second embodiment shown in FIG. 8, both of the collectors 14 and 15 are made, as an example, of punching metal. Further, in this case, in order to use common material for both of the collectors 14 and 15, the dimensions of the corrugations, i.e., the height and the pitch of the corrugations, are the same as those of the fuel electrode side collector according to the first embodiment. When this structure is adopted, in order to achieve sufficient sectional area of the flow field on the air electrode side where the height of the corrugations is low, the separator 16 also has protruding corrugations 161, which protrude toward the collector 14 and which are spaced so as to match the spacing of the grooves 144 of the collector 14. As a result of this configuration, the separator base plate 16 has a corrugated plate-like shape. In the following description, the structural elements that are identical to those of the first embodiment are denoted with the same reference numerals, and a description thereof will be omitted. Only sections of the configuration that are different from the first embodiment will be described.

In the second embodiment, the thickness of the collectors 14 and 15 are the same as the thickness of the collectors 14 and 15 of the first embodiment; however, the second embodiment differs from the first embodiment in that a large number of holes are formed in the plates of the collectors 14 and 15 by punching. In the illustrated embodiment, the plates have a thickness of 0.2 mm, and the holes having longitudinal and lateral diameters of 0.1 mm are formed at intervals of 0.1 mm. In FIG. 8, the openings of the holes 143' and 153' are arranged in the longitudinal direction and the lateral direction. However, the arrangement of the openings is not limited to this configuration. As with the first embodiment, the holes 143' and 153' may be arranged in any direction including an oblique direction. The height of the protruding corrugations 161 of the separator base plate 16 in this embodiment can be designed such that the height of the protruding corrugations 161 and the height of the protruding corrugations 141 of the collector 14 when combined is equal to the height of the protruding corrugations of the collector 14 of the first embodiment. If such a configuration is adopted, the cross sectional area of the flow field on the air electrode side is the same as that of the first embodiment.

In the second embodiment, as with the first embodiment, each of the collectors 14 and 15 has a fine mesh like portion which contacts the diffusion layer. Therefore, it is possible to supply the air to all of the electrode surfaces of the fuel cell stack 1, and concentration polarization is reduced. Further, since the electrode contacts the mesh like portion of the collector, current collection is performed uniformly from the entire electrode, and current collection resistance is reduced. Moreover, since the catalyst throughout the entire electrode is effectively utilized, activation polarization is reduced. Additionally, the effective area of the electrode used for power generation is increased advantageously.

Third Embodiment

Figure 9:
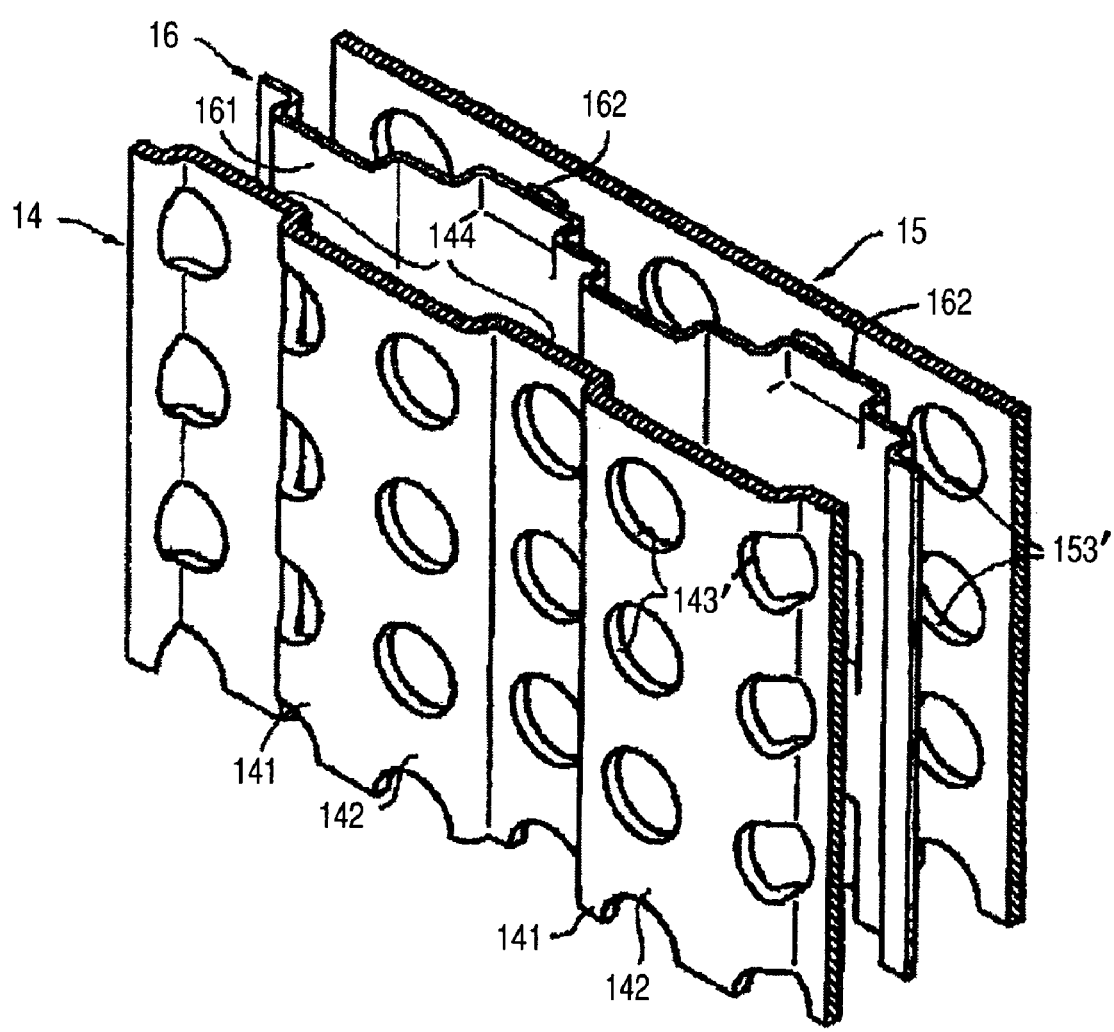
FIG. 9 is an exploded partial perspective view showing a separator according to a third embodiment of the present invention.

In the third embodiment shown in FIG. 9, as with the second embodiment, both of the collectors 14 and 15 are made of punching metal. However, the third embodiment differs from the second embodiment in that the collector 15 of the fuel electrode side is a flat plate without any corrugations. In this example, in order to achieve sufficient sectional area of the flow fields on both sides of the air electrode and the fuel electrode, the separator base plate 16 has protruding corrugations 161 and 162 protruding toward the air electrode and the fuel electrode from a base surface of the base plate 16. The other structural elements of the third embodiment are identical to those of the second embodiment. Therefore, these structural elements are denoted with the same reference numerals, and description thereof will be omitted.

What is claimed is:

1. A proton exchange membrane fuel cell comprising:
   unit cells that respectively include an electrolyte membrane, and a fuel electrode, using hydrogen gas as a fuel, and an air electrode, using air as an oxidizer, provided on respective surfaces of the electrolyte membrane;
   mixing means for introducing water to an air feed to the air electrode; and
   a separator interposed between the unit cells, the separator and the unit cells being stacked to form the fuel cell in which a mixed fluid of air and water is supplied to the air electrode of each unit cell through the separator, wherein
   the separator includes an expanded metal sheet formed into a corrugated plate provided with thin projecting portions, serving as a current collector, through which the mixed fluid can pass, the expanded metal sheet being in contact with the air feed and with an electrode diffusion layer of the air electrode, droplets of water adhering to and evaporating from a surface of the expanded metal sheet to provide latent heat cooling;
   wherein flat top surfaces of the thin projecting portions of the expanded metal sheet are in contact with the electrode diffusion layer at the air electrode;
   wherein base portions between the thin projecting portions of the expanded metal sheet are in contact with a separator base; and wherein a hydrophilic treatment is applied to the expanded metal sheet so that the water droplets are better retained on the expanded metal sheet.

2. The fuel cell according to claim 1, wherein the expanded metal sheet has an opening ratio of 25% or more.

3. The fuel cell according to claim 1, wherein the separator is formed by layering the expanded metal sheet and a gas interruption base plate.

4. The fuel cell according to claim 3, wherein the gas interruption base plate is a thin flat plate.

5. The fuel cell according to claim 1, wherein the expanded metal sheet has a plurality of rhombic holes through which the mixed fluid can pass.

* * * * *